(12) United States Patent
Tsuchida et al.

(10) Patent No.: US 10,137,733 B2
(45) Date of Patent: *Nov. 27, 2018

(54) PNEUMATIC TIRE

(71) Applicant: SUMITOMO RUBBER INDUSTRIES, LTD., Kobe-shi, Hyogo (JP)

(72) Inventors: Tsuyoshi Tsuchida, Kobe (JP); Tatsuya Miyazaki, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 56 days.

This patent is subject to a terminal disclaimer.

(21) Appl. No.: 15/031,389

(22) PCT Filed: Oct. 21, 2014

(86) PCT No.: PCT/JP2014/077883
§ 371 (c)(1),
(2) Date: Apr. 22, 2016

(87) PCT Pub. No.: WO2015/076049
PCT Pub. Date: May 28, 2015

(65) Prior Publication Data
US 2016/0263942 A1  Sep. 15, 2016

(30) Foreign Application Priority Data
Nov. 20, 2013 (JP) ................. 2013-240133

(51) Int. Cl.
| B60C 1/00 | (2006.01) |
| B60C 11/00 | (2006.01) |
| C08L 9/00 | (2006.01) |
| C08L 91/00 | (2006.01) |
| C08L 45/02 | (2006.01) |
| C08F 36/06 | (2006.01) |
| C08K 3/04 | (2006.01) |
| C08K 5/09 | (2006.01) |

(52) U.S. Cl.
CPC .............. B60C 1/0016 (2013.01); B60C 1/00 (2013.01); B60C 11/0008 (2013.01); C08F 36/06 (2013.01); C08K 3/04 (2013.01); C08K 5/09 (2013.01); C08L 9/00 (2013.01); C08L 45/02 (2013.01); C08L 91/00 (2013.01)

(58) Field of Classification Search
CPC ..... B60C 1/0016; B60C 1/00; B60C 11/0008; C08L 9/00; C08L 91/00; C08L 45/02; C08F 36/06; C08K 3/04; C08K 5/09
USPC ........................................................ 524/526
See application file for complete search history.

(56) References Cited

U.S. PATENT DOCUMENTS

| 3,019,207 A | 1/1962 | Crane |
| 4,928,896 A | 5/1990 | Symon |
| 6,465,579 B1 | 10/2002 | Chino et al. |
| 7,288,602 B2 | 10/2007 | Thielen et al. |
| 2002/0132904 A1 | 9/2002 | Langstein et al. |
| 2012/0208964 A1* | 8/2012 | Kloppenburg ............ B60C 1/00 525/232 |
| 2012/0225974 A1 | 9/2012 | Uno et al. |
| 2014/0011944 A1 | 1/2014 | Kondo |
| 2014/0155521 A1 | 6/2014 | Miyazaki |
| 2016/0200901 A1* | 7/2016 | Tsuchida .................. B60C 1/00 524/495 |

FOREIGN PATENT DOCUMENTS

| CN | 102432927 A | 5/2012 |
| CN | 102653603 A | 9/2012 |
| CN | 103085187 A | 5/2013 |
| EP | 2 716 700 A1 | 4/2014 |
| EP | 3 064 543 A1 | 9/2016 |
| EP | 3 064 544 A1 | 9/2016 |
| JP | 2002-234978 A | 8/2002 |
| JP | 2004-277506 A | 10/2004 |
| JP | 2005-154754 A | 6/2005 |
| JP | 2005-179393 A | 7/2005 |
| JP | 2010-100033 A | 5/2010 |
| JP | 2010-275393 A | 12/2010 |
| JP | 2011012248 A * | 1/2011 |
| JP | 2011-89031 A | 5/2011 |
| JP | 2011-256282 A | 12/2011 |
| JP | 2013-7025 A | 1/2013 |
| JP | 2013-023640 A | 2/2013 |
| JP | 2013-053296 A | 3/2013 |
| JP | 2013-82840 A | 5/2013 |
| WO | WO 2008/044722 A1 | 4/2008 |
| WO | WO 2012/165038 A1 | 12/2012 |

OTHER PUBLICATIONS

English language machine translation of JP 2011-012248, Jan. 2011.*
Machine translation of JP-2004-277506-A dated Oct. 7, 2004.
Machine translation of JP-2005-154754-A dated Jun. 16, 2005.
Machine translation of JP-2005-179393-A dated Jul. 7, 2005.
Machine translation of JP-2011-256282-A dated Dec. 22, 2011.
Machine translation of JP-2013-23640-A dated Feb. 4, 2013.
Machine translation of WO-2008/044722-A1 dated Apr. 17, 2008.

(Continued)

Primary Examiner — Angela C Scott
(74) Attorney, Agent, or Firm — Birch, Stewart, Kolasch & Birch LLP

(57) ABSTRACT

Provided is a pneumatic tire including a tread formed from a predetermined rubber composition to achieve greatly improved abrasion resistance while maintaining good wet-grip performance and good durability. The present invention relates to a pneumatic tire including a tread formed from a rubber composition, the rubber composition containing predetermined amounts of a specific oil-extended polybutadiene rubber, of an isoprene-based diene rubber and/or a styrene-butadiene rubber, of a specific carbon black, and of stearic acid, the oil-extended polybutadiene rubber being synthesized using a rare earth catalyst, the rubber composition having an amount of process oil of a predetermined value or less.

4 Claims, No Drawings

(56) References Cited

OTHER PUBLICATIONS

"CKC-30 APKM-27 / SBR-1723 TDAE, Synthetic Butadiene-Styrene Rubber," obtained online from http://sibur-int.com/upload/documents/CKC-30APKM-27(SBR-1723%20TDAE)_.pdf, 1 page, U.S. Office Action, dated Jun. 2, 2016 in U.S. Appl. No. 14/913,225.
Tokai Carbon Co. Ltd, "Physicochemical Properties," obtained on line from http://www.tokaicarbon.co.jp/en/products/carbon_b/seast/, 3 pages, U.S. Office Action, dated Jun. 2, 2016 in U.S. Appl. No. 14/913,225.
Written Opinion of the International Searching Authority and English translation of the International Search Report (forms PCT/ISA/237 and PCT/ISA/210), dated Oct. 7, 2014, for International Application No. PCT/JP2014/071526.

\* cited by examiner

PNEUMATIC TIRE

TECHNICAL FIELD

The present invention relates to a pneumatic tire including a tread formed from a predetermined rubber composition.

BACKGROUND ART

Treads of tires are required to have wet-grip performance, durability, abrasion resistance and other properties. Abrasion resistance is important especially for users in the North American market where the average monthly mileage is high. Thus, there is a need to improve abrasion resistance while maintaining wet-grip performance and durability, and even production cost.

In general, silica formulations have good wet-grip performance but are inferior in abrasion resistance to carbon black formulations. Possible ways to improve abrasion resistance are to increase the amount of silica and to use fine particle silica having excellent abrasion resistance or a silane coupling agent that strongly binds to polymers. These methods unfortunately increase the cost of the silane coupling agent. Therefore, it is desired to improve abrasion resistance by improving polymers or softeners.

Patent Literature 1 discloses a rubber composition for tire treads whose abrasion resistance, fuel economy, and wet-grip performance are improved by incorporating a liquid resin having a softening point of −20° C. to 45° C. and a specific silica.

CITATION LIST

Patent Literature

Patent Literature 1: JP 2013-053296 A

SUMMARY OF INVENTION

Technical Problem

Although rubber compositions for tire treads with improved properties such as abrasion resistance and wet-grip performance have been developed as described above, there remains room to improve abrasion resistance while maintaining good wet-grip performance and good durability.

The present invention aims to solve the above problem and provide a pneumatic tire including a tread formed from a predetermined rubber composition to achieve greatly improved abrasion resistance while maintaining good wet-grip performance and good durability.

Solution To Problem

The present invention relates to a pneumatic tire, including a tread formed from a rubber composition, the rubber composition containing: an oil-extended polybutadiene rubber having a cis content of 95 mol % or more, a vinyl content of 1 mol % or less, and a weight average molecular weight of 530,000 or more; at least one of an isoprene-based diene rubber or a styrene-butadiene rubber; a carbon black having a nitrogen adsorption specific surface area of 110 to 200 $m^2/g$; and stearic acid, the oil-extended polybutadiene rubber being synthesized using a rare earth catalyst, the rubber composition containing, based on 100% by mass of the total rubber solids, 8% to 65% by mass of a polybutadiene rubber component contained in the oil-extended polybutadiene rubber and 20% to 85% by mass of the at least one of an isoprene-based diene rubber or a styrene-butadiene rubber, the rubber composition containing, relative to 100 parts by mass of the total rubber solids, 20 to 100 parts by mass of the carbon black and 1.5 to 2.99 parts by mass of the stearic acid, the rubber composition having an amount of process oil of 9 parts by mass or less relative to 100 parts by mass of the total rubber solids.

The oil-extended polybutadiene rubber preferably has a weight average molecular weight of 700,000 or more.

The rubber composition preferably contains the carbon black in an amount of 40 to 80 parts by mass relative to 100 parts by mass of the total rubber solids.

Advantageous Effects of Invention

The pneumatic tire of the present invention includes a tread formed from a rubber composition which contains predetermined amounts of a specific oil-extended polybutadiene rubber, of an isoprene-based diene rubber and/or a styrene-butadiene rubber, of a specific carbon black, and of stearic acid, and has an amount of process oil reduced to a predetermined value or less. Such a pneumatic tire can achieve greatly improved abrasion resistance while maintaining good wet-grip performance and good durability.

DESCRIPTION OF EMBODIMENTS

The pneumatic tire of the present invention includes a tread formed from a rubber composition which contains predetermined amounts of a specific oil-extended polybutadiene rubber, of an isoprene-based diene rubber and/or a styrene-butadiene rubber, of a specific carbon black, and of stearic acid, and has an amount of process oil reduced to a predetermined value or less. Such a pneumatic tire is able to achieve markedly improved abrasion resistance while maintaining good wet-grip performance and good durability and suppressing production cost.

The tread in the present invention may be a single-layer tread, any of components (i.e. a cap tread and a base tread) of a two-layer tread, or any of components of a multiple-layer tread consisting of three or more layers.

In the pneumatic tire of the present invention, the use of a specific oil-extended polybutadiene rubber and an isoprene-based diene rubber and/or a styrene-butadiene rubber allows the polybutadiene rubber to be soft, and because of its high molecular weight, the polymer is prevented from breaking easily. Further, the polybutadiene rubber phase and the phase of isoprene-based diene rubber and/or styrene-butadiene rubber are finely dispersed and entangled with each other. As a result, strain can be distributed over the entire rubber and, further, a carbon black having a high nitrogen adsorption specific surface area will be well distributed and dispersed to the rubber phase. It is probably for this reason that the above properties are improved. Furthermore, the use of the oil-extended polybutadiene rubber allows carbon black to be sufficiently dispersed in the polymer phases even when the amount of carbon black is higher than usual. Thus, carbon black and other fillers will be dispersed in minute areas of the polybutadiene rubber phase, thereby preventing easy breakage or crack growth on a micro level.

The rubber composition is first described.

The rubber composition in the present invention contains: an oil-extended polybutadiene rubber (oil-extended BR) synthesized using a rare earth catalyst and having a cis content of 95 mol % or more, a vinyl content of 1 mol % or less, and a weight average molecular weight of 530,000 or more; an isoprene-based diene rubber and/or a styrene-butadiene rubber (SBR); a carbon black having a nitrogen adsorption specific surface area of 110 to 200 m²/g; and stearic acid.

The rare earth catalyst for the oil-extended BR may be a known rare earth catalyst. Examples include catalysts containing lanthanide rare earth compounds, organic aluminum compounds, aluminoxanes, or halogen-containing compounds, optionally with Lewis bases. Among these, neodymium (Nd) catalysts including Nd-containing compounds as lanthanide rare earth compounds are particularly preferred.

Examples of the lanthanide rare earth compounds include halides, carboxylates, alcoholates, thioalcoholates, and amides of rare earth metals of atomic numbers 57 to 71. As described above, Nd catalysts are preferred among these because they allow the resulting BR to have a high cis content and a low vinyl content.

The oil-extended BR has a cis content of 95 mol % or more, preferably 96 mol % or more. If the cis content is less than 95 mol %, good abrasion resistance or durability cannot be obtained. The upper limit of the cis content is not particularly limited and may be 100 mol %.

The oil-extended BR has a vinyl content of 1 mol % or less, preferably 0.5 mol % or less. If the vinyl content is more than 1 mol %, abrasion resistance or durability may be reduced. The lower limit of the vinyl content is not particularly limited and may be 0 mol %.

The oil-extended BR has a weight average molecular weight (Mw) of 530,000 or more, preferably 600,000 or more, more preferably 700,000 or more. Conversely, although the upper limit of the Mw is not particularly limited, it is preferably 1,000,000 or less, more preferably 950,000 or less. If the Mw is less than 530,000, abrasion resistance or durability may be poor. When the Mw is more than 1,000,000, the polymer cannot be readily dispersed and cannot readily incorporate filler, so that durability tends to deteriorate.

The oil-extended BR refers to a polybutadiene rubber prepared by adding an extender component such as oil to polybutadiene rubber in the production of the polymer. Examples of the extender component include paraffin oil, aromatic oil, naphthenic oil, mild extraction solvates (MES), treated distillate aromatic extracts (TDAE), and solvent residue aromatic extracts (S-RAE). Among these, MES or TDAE is preferred. In view of abrasion resistance and grip performance, TDAE is particularly preferred, while for grip performance on ice, MES having a low grass transition temperature (Tg) is preferred.

The level of oil extension of the oil-extended BR (the amount of the oil component relative to 100 parts by mass of the BR component) is not particularly limited. The level may be appropriately chosen and is usually 5 to 100 parts by mass, preferably 10 to 50 parts by mass.

The oil-extended BR can, for example, be prepared by known methods using rare earth catalysts, or may be a commercial product. Examples of the commercial products include BUNA-CB29 TDAE (rare earth-catalyzed BR synthesized using a Nd catalyst, containing 37.5 parts by mass of TDAE relative to 100 parts by mass of the rubber component; cis content: 95.8 mol %, vinyl content: 0.4 mol %, Mw: 760,000) available from Lanxess and BUNA-CB29 MES (rare earth-catalyzed BR synthesized using a Nd catalyst, containing 37.5 parts by mass of MES relative to 100 parts by mass of the rubber component; cis content: 96.1 mol %, vinyl content: 0.4 mol %, Mw: 737,000) available from Lanxess.

The amount of the BR component (BR solids) contained in the oil-extended BR, based on 100% by mass cf the total rubber solids, is 8% by mass or more, preferably 15% by mass or more, more preferably 20% by mass or more, still more preferably 25% by mass or more, particularly preferably 35% by mass or more. The amount is 65% by mass or less, preferably 60% by mass or less, more preferably 55% by mass or less, still more preferably 50% by mass or less. If the amount is less than 8% by mass, abrasion resistance may deteriorate, and durability tends to be reduced, while if the amount is more than 65% by mass, the total oil content in the rubber compound is excessive so that the compatibility of filler with the rubber component may decrease and durability or abrasion resistance may deteriorate.

Herein, the total rubber solids refers to the solid content of the rubber component in the rubber composition. However, in the case where the rubber component includes a liquid rubber which is crosslinkable with sulfur, the amount of the liquid rubber is also included in the total rubber solids.

The BR component in the rubber composition may include another BR other than the oil-extended BR, for example, non-oil-extended BR.

The combined amount of the BR component contained in the oil-extended BR and the other BR (the total amount of BR solids), based on 100% by mass of the total rubber solids, is preferably 15% by mass or more, more preferably 20% by mass or more, while it is preferably 70% by mass or less, more preferably 65% by mass or less. When the combined amount falls within the above range, the effects of the present invention can be sufficiently achieved.

The isoprene-based diene rubber may be, for example, synthetic polyisoprene rubber (IR), natural rubber (NR), or modified natural rubbers. Examples of NR include deproteinized natural rubber (DPNR) and highly purified natural rubber (UPNR). Examples of modified natural rubbers include epoxidized natural rubber (ENR), hydrogenated natural rubber (HNR), and grafted natural rubber. Among these, NR or IR is preferred, with NR being more preferred.

The SBR preferably has a bound styrene content of 30% by mass or more, more preferably 34% by mass or more, but preferably 50% by mass or less, more preferably 46% by mass or less. When the bound styrene content is less than 30% by mass, insufficient wet-grip performance may be obtained. When the bound styrene content is more than 50% by mass, the polymer cannot be readily dispersed, and durability may deteriorate.

The SBR preferably has a weight average molecular weight (Mw) of 700,000 or more, more preferably 800,000 or more, still more preferably 900,000 or more, particularly preferably 1,000,000 or more. Conversely, although the upper limit of the Mw is not particularly limited, it is preferably 1,500,000 or less, more preferably 1,300,000 or less. When the Mw is less than 700,000, abrasion resistance may be reduced. When the Mw is more than 1,500,000, the polymer cannot be readily dispersed and cannot readily incorporate filler, so that durability tends to deteriorate.

The SBR preferably has a vinyl content of 5 mol % or more, more preferably 10 mol % or more, still more preferably 15 mol % or more, but preferably 60 mol % or less, more preferably 50 mol % or less. When the vinyl content falls within the above range, the effects of the present invention can be sufficiently achieved.

The SBR is not particularly limited, and examples include emulsion-polymerized SBR (E-SBR) and solution-polymerized SBR (S-SBR), which may or may not be oil-extended. In view of abrasion resistance, the SBR is preferably an oil-extended E-SBR, among others. Various oil-extended modified SBRs for silica (e.g. oil-extended SBRs having a polymer chain end or main chain modified with any of various modifiers) may also be used.

When an oil-extended SBR is incorporated, the oil-extended SBR is a styrene-butadiene rubber prepared by adding an extender component such as oil to styrene-butadiene rubber in the production of the polymer. Examples of the extender component are as described above. Aromatic oil, TDAE, naphthenic oil, MES, and S-RAE, among others, are preferred. In view of abrasion resistance, TDAE or S-RAE is particularly preferred.

The level of oil extension of the oil-extended SBR (the amount of the oil component relative to 100 parts by mass of the SBR component) is not particularly limited. The level may be appropriately chosen and is usually 5 to 100 parts by mass, preferably 10 to 50 parts by mass.

The SBR may be prepared by known methods, such as anionic polymerization, solution polymerization, or emulsion polymerization, or may be a commercial product. Examples of the commercial products include Nipol 9548 available from Zeon Corporation and 0122 available from JSR Corporation.

The amount of the isoprene-based diene rubber and/or the SBR, based on 100% by mass of the total rubber solids, is 20% by mass or more, preferably 25% by mass or more, while it is 85% by mass or less, preferably 80% by mass or less. If the amount is less than 20% by mass, wet-grip performance may deteriorate. If the amount is more than 85% by mass, heat build-up is increased and the amount of BR is reduced, so that fuel economy and abrasion resistance may deteriorate. When the SBR is an oil-extended SBR, the amount of the SBR refers to the amount of the SBR component (SBR solids) contained in the oil-extended SBR.

In the case of the rubber composition containing either an isoprene-based diene rubber or SBR alone, the amount of the isoprene-based diene rubber and/or the SBR herein refers to the amount of the isoprene-based diene rubber or the SBR, while in the case of the rubber composition containing both an isoprene-based diene rubber and SBR, it refers to the combined amount of the isoprene-based diene rubber and the SBR.

As described above, the effects of the present invention can be exhibited when the amount of the isoprene-based diene rubber and/or the SBR is 20% to 85% by mass based on 100% by mass of the total rubber solids. The particularly preferred range of the amount varies depending on which tire component the rubber composition is applied to. For example, when the rubber composition is used in a tread rubber for studless winter tires, the amount is preferably 30% by mass or more, more preferably 35% by mass or more, while it is preferably 50% by mass or less, more preferably 45% by mass or less. When the rubber composition is used in a tread rubber for summer tires, the amount is preferably 60% by mass or more, more preferably 62% by mass or more, while it is preferably 85% by mass or less, more preferably 80% by mass or less. In other cases where the rubber composition is used in a base tread having a composition designed to have a grip force even when it contacts the road surface during service, or in a base tread with no emphasis on fuel economy, the amount is preferably 60% by mass or more, more preferably 65% by mass or more, while it is preferably 80% by mass or less, more preferably 78% by mass or less. For use in a base tread designed with an emphasis on fuel economy, SBR is preferably not used.

The SBR component in the rubber composition may include another SBR other than the above-described SBR.

The combined amount of the SBR component contained in the above SBR and the other SBR (the total amount of SBR solids), based on 100% by mass of the total rubber solids, is preferably 30% by mass or more, more preferably 35% by mass or more, while it is preferably 80% by mass or less, more preferably 70% by mass or less. When the combined amount falls within the above range, BR which is effective against abrasion can be used in a moderate amount to adjust the total oil content in the rubber compound to a moderate level, and therefore the effects of the present invention can be sufficiently achieved.

Herein, the cis content (the amount of cis-1,4-butadiene units) and the vinyl content (the amount of 1,2-butadiene units) in BR and the vinyl content in SBR can be measured by infrared absorption spectrometry. The bound styrene content in SBR is determined by $^1$H-NMR analysis. The weight average molecular weights (Mw) of BR and SBR can be determined by the method described in examples.

In the rubber composition, the blending ratio of the BR component contained in the oil-extended BR and the isoprene-based diene rubber and/or SBR component [(mass of BR component)/(mass of isoprene-based diene rubber and/or SBR component)] is preferably 20/80 to 80/20, more preferably 30/70 to 70/30, still more preferably 30/70 to 67/33. When the blending ratio is less than 20/80 or more than 80/20, the effects of the present invention tend not to be sufficiently achieved. For use in tires for light trucks, since the ground contact surface pressure per unit area of such tires is higher than that of tires for passenger vehicles and accordingly wet-grip performance is automatically increased, the isoprene-based diene rubber and/or SBR, and especially SBR having a high Tg, may be used in a relatively small amount.

In the case of the rubber composition containing either an isoprene-based diene rubber or SBR alone, the mass of the isoprene-based diene rubber and/or SBR component refers to the amount of the isoprene-based diene rubber or the SBR component contained in the SBR, while in the case of the rubber composition containing both an isoprene-based diene rubber and SBR, it refers to the combined amount of the isoprene-based diene rubber and the SBR component contained in the SBR.

Examples of rubber materials that can be used in the rubber component in the rubber composition other than the BR component and the isoprene-based diene rubber and/or SBR component include diene rubbers such as styrene-isoprene-butadiene rubber (SIBR), chloroprene rubber (CR), or acrylonitrile butadiene rubber (NBR), and non-diene rubbers such as ethylene-propylene-diene rubber (EPDM), butyl rubber (IIR), or halogenated butyl rubber (X-IIR).

The rubber composition contains a carbon black having a nitrogen adsorption specific surface area of 110 to 200 $m^2/g$. Examples of the carbon black include GPF, FEF, HAF, ISAF, and SAF.

The nitrogen adsorption specific surface area ($N_2SA$) of the carbon black is 110 $m^2/g$ or more, preferably 130 $m^2/g$ or more, while it is 200 $m^2/g$ or less, preferably 180 $m^2/g$ or less. If the $N_2SA$ is less than 110 $m^2/g$, grip performance or abrasion resistance may be reduced. If the $N_2SA$ is more than 200 $m^2/g$, such a carbon black may not show sufficient dispersibility, thereby resulting in poor durability. In addition, abrasion resistance tends to be reduced. The $N_2SA$ of the carbon black is determined in accordance with JIS K 6217-2:2001.

The amount of the carbon black relative to 100 parts by mass of the total rubber solids is 20 parts by mass or more, preferably 30 parts by mass or more, more preferably 40 parts by mass or more. Since the oil-extended BR is used in the present invention, the carbon black, even in a larger amount than usual, can be sufficiently dispersed in the polymer phases. Also, the amount of the carbon black is 100 parts by mass or less, preferably 90 parts by mass or less, more preferably 80 parts by mass or less, still more preferably 70 parts by mass or less. If the amount is less than 20 parts by mass, a small amount of filler will be incorporated in the oil-extended BR, so that sufficient abrasion resistance may not be obtained and the rubber may have greatly reduced resistance to degradation by ultraviolet rays. If the amount of the carbon black is more than 100 parts by mass, durability or abrasion resistance may deteriorate. Particularly for use in tires for light trucks, among others, the amount of the carbon black relative to 100 parts by mass of the total rubber solids is preferably 40 to 80 parts by mass because such an amount can be expected to provide good abrasion resistance. In particular, in the case for example of a fine particle carbon black having a nitrogen adsorption specific surface area (BET specific surface area) of approximately 165, the amount of the carbon black relative to 100 parts by mass of the total rubber solids is preferably 45 to 55 parts by mass.

The rubber composition preferably further contains silica. Non-limiting examples of the silica include dry silica (anhydrous silica) and wet silica (hydrous silica). Wet silica (hydrous silica) is preferred because it has many silanol groups.

The silica preferably has a nitrogen adsorption specific surface area ($N_2SA$) of 80 $m^2/g$ or more, more preferably 100 $m^2/g$ or more, but preferably 280 $m^2/g$ or less, more preferably 250 $m^2/g$ or less. When the $N_2SA$ falls within the above range, the effects of the present invention can be sufficiently achieved.

The $N_2SA$ of the silica is measured in accordance with ASTM D3037-81.

For example, for use in tires for passenger vehicles which are expected to have wet-grip performance or performance on snow, the amount of the silica relative to 100 parts by mass of the total rubber solids is preferably 15 parts by mass or more, more preferably 20 parts by mass or more. Since the oil-extended BR is used in the present invention, the silica, even in a larger amount than usual, can be sufficiently dispersed in the polymer phases. Also, the amount of the silica is preferably 125 parts by mass or less, more preferably 120 parts by mass or less. When the amount is less than 15 parts by mass, a small amount of filler will be incorporated in the SBR, so that sufficient wet-grip performance or reinforcing properties (abrasion resistance) may not be obtained. When the amount is more than 125 parts by mass, the amount of filler is too large to readily disperse the filler, and fuel economy may be reduced.

In the case of the rubber composition containing silica, the combined amount of the silica and the carbon black, relative to 100 parts by mass of the total rubber solids, is preferably 60 parts by mass or more, more preferably 65 parts by mass or more, while it is preferably 135 parts by mass or less, more preferably 130 parts by mass or less. When the combined amount is less than 60 parts by mass, abrasion resistance may be reduced. When the combined amount is more than 135 parts by mass, fuel economy may be reduced.

In the case of the rubber composition containing silica, the ratio of the silica and the carbon black (silica/carbon black ratio by mass) is preferably 20/80 to 96/4, more preferably 25/75 to 85/15. When the ratio is less than 20/80, fuel economy and wet-grip performance may be reduced. When the ratio is more than 96/4, durability and abrasion resistance may be reduced.

The rubber composition in the present invention contains stearic acid in an amount of 1.5 to 2.99 parts by mass relative to 100 parts by mass of the total rubber solids. The amount of the stearic acid is preferably 1.8 parts by mass or more, more preferably 2.0 parts by mass or more, while it is preferably 2.75 parts by mass or less, more preferably 2.5 parts by mass or less. If the amount is less than 1.5 parts by mass, the rubber composition tends to have an insufficient curing rate or hardness, thereby resulting in a decrease in handling stability or abrasion resistance. Conversely, if the amount is more than 2.99 parts by mass, slippage between the polymer phases may occur, particularly in the case of the low viscosity composition, so that the polymer phases cannot be readily entangled with each other, and the kneading torque may be less like to work. Then, wet-grip performance or abrasion resistance tends to be reduced, and handling stability may also deteriorate.

In the rubber composition, the amount of process oil relative to 100 parts by mass of the total rubber solids is 9 parts by mass or less, preferably 7 parts by mass or less, more preferably 5 parts by mass or less. No process oil may be incorporated. Herein, the process oil refers to additional oil to be added separately from the oil contained in the oil-extended BR and other oil-extended rubbers such as oil-extended SBR. According to the present invention, the use of the oil-extended rubber allows for a reduction in the amount of process oil as a compounding agent, as a result of which slippage on kneading rotors and slippage between the polymer phases can be suppressed during processing, and the polymer phases (the rubber component) can be readily mixed with each other.

The type of process oil may be as described for the oil to be added as an extender component in the oil-extended BR or oil-extended SBR.

The rubber composition usually contains a crosslinking agent such as sulfur or a hybrid crosslinking agent. The sulfur may be one commonly used in the rubber industry, such as powdered sulfur, precipitated sulfur, colloidal sulfur, insoluble sulfur, highly dispersible sulfur, or soluble sulfur. Examples of the hybrid crosslinking agents include commercial products such as KA9188.

In the rubber composition, the total amount of sulfur derived from crosslinking agents, relative to 100 parts by mass of the total rubber solids, is preferably 0.4 parts by mass or more, more preferably 0.5 parts by mass or more, still more preferably 0.8 parts by mass or more, while it is preferably 1.6 parts by mass or less, more preferably 1.4 parts by mass or less, still more preferably 1.3 parts by mass or less. When the total amount is less than 0.4 parts by mass, vulcanizate hardness (Hs) or co-curing with neighboring rubber compounds may be insufficient. When the total amount is more than 1.6 parts by mass, abrasion resistance may deteriorate. The total amount of sulfur derived from crosslinking agents refers to the net sulfur content in the entire crosslinking agents introduced in the final kneading. For example, when insoluble sulfur (containing oil) is used as a crosslinking agent, it means the net sulfur content, excluding the oil content.

The rubber composition may contain a resin conventionally used in rubber compositions for tires. Any type of resin may be used, and examples include coumarone-based resins such as coumarone-indene resin, aromatic vinyl polymers (resins obtained by polymerizing α-methylstyrene and/or styrene), terpene-based resins such as polyterpene resins, aromatic modified terpene resins, or terpene phenolic resins, and rosin-based resins. In view of improving wet-grip performance, terpene-based resins are preferred among these; polyterpene resins or terpene phenolic resins are more preferred. In other preferred embodiments, combinations of polyterpene resins and terpene phenolic resins are used. The coumarone-based resins can be expected to improve tensile strength and durability as well as grip performance.

The coumarone-based resin is preferably a coumarone-indene resin having a softening point of −20° C. to 45° C. The coumarone-indene resin refers to a resin containing coumarone and indene as monomer components forming the backbone (main chain) of the resin. Examples of monomer components other than coumarone and indene that can be contained in the backbone include styrene, α-methylstyrene, methylindene, and vinyltoluene.

The coumarone-indene resin has a softening point of −20° C. or higher, preferably −10° C. or higher. When the softening point is lower than −20° C., the effects of improving fuel economy or durability may not be sufficiently obtained. The softening point is 45° C. or lower, preferably 40° C. or lower. When the softening point is higher than 45° C., fuel economy or durability tends to deteriorate.

The softening point of the coumarone-indene resin is measured in accordance with JIS K 6220-1:2001 using a ring and ball softening point measuring apparatus and is defined as the temperature at which the ball drops down.

Examples of the terpene-based resins include polyterpene resins obtained by polymerizing terpene compounds, and aromatic modified terpene resins obtained by polymerizing Terpene compounds and aromatic compounds. Hydrogenated products of these resins may also be used.

The polyterpene resin refers to a resin obtained by polymerizing a terpene compound. The terpene compound refers to a hydrocarbon having a composition represented by $(C_{10}H_8)_n$ or an oxygen-containing derivative thereof, which has a terpene backbone and is classified as a monoterpene $(C_{10}H_{16})$, a sesquiterpene $(C_{15}H_{24})$, a diterpene $(C_{20}H_{32})$ or other terpenes. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include resins made from the above-mentioned terpene compounds, such as pinene resin, limonene resin, dipentene resin, and pinene-limonene resin. Pinene resin usually contains both α-pinene and β-pinene which are structural isomers of pinene, and is classified into β-pinene resin mainly containing β-pinene and α-pinene resin mainly containing α-pinene, depending on the type of component contained therein. In the present invention, β-pinene resin or limonene resin can be suitably used.

Examples of the aromatic modified terpene resins include terpene phenolic resins made from the above-mentioned terpene compounds and phenolic compounds; and terpene styrene resins made from the above-mentioned terpene compounds and styrenic compounds. Also, terpene phenol styrene resins made from the above-mentioned terpene compounds, phenolic compounds, and styrenic compounds may be used. Examples of the phenolic compounds include phenol, bisphenol A, cresol, and xylenol. Moreover, examples of the styrenic compounds include styrene and α-methylstyrene.

The terpene-based resin preferably has a softening point of 104° C. to 126° C. Such a terpene-based resin having a specific softening point range will be selectively distributed to the phase of isoprene-based diene rubber and/or styrene-butadiene rubber in the rubber composition, and thus will not deteriorate the low temperature plasticity of the oil-extended BR. In contrast, when the terpene-based resin has a softening point outside the above range, wet-grip performance, abrasion resistance, or durability may not be sufficiently obtained.

The softening point of the terpene-based resin is more preferably 106° C. or higher, still more preferably 110° C. or higher, while it is more preferably 124° C. or lower, still more preferably 120° C. or lower.

The softening point of the terpene-based resin is measured in accordance with JIS K 6220-1:2001 using a ring and ball softening point measuring apparatus and is defined as the temperature at which the ball drops down.

The terpene-based resin preferably has a hydroxyl value (mgKOH/g-gel) of 100 or less, more preferably 50 or less, still more preferably 5 or less, particularly preferably 1 or less, most preferably 0. When the hydroxyl value is more than 100, wet-grip performance, abrasion resistance, or durability may not be sufficiently obtained.

The hydroxyl value of the terpene-based resin refers to the amount in milligram of potassium hydroxide required to neutralize the acetic acid bonded to hydroxyl groups on acetylation of 1 g of the terpene-based resin, and is measured by potentiometric titration (JIS K 0070:1992). Accordingly, the hydroxyl value of terpene-based resins containing no phenolic compound is usually 0.

When the resin is incorporated, the amount of the resin relative to 100 parts by mass of the total rubber solids is preferably 1 part by mass or more, more preferably 3 parts by mass or more, while it is preferably 30 parts by mass or less, more preferably 20 parts by mass or less. When the amount is less than 1 part by mass, fuel economy or durability may not be sufficiently obtained. When the amount is more than 30 parts by mass, sufficient low temperature plasticity may not be obtained, so that performance on snow may deteriorate.

The rubber composition may incorporate a processing aid. This can improve the dispersibility of filler, and especially silica, or of the isoprene-based diene rubber gel to improve wet-grip performance, abrasion resistance, and roll processability.

Examples of the processing aids include fatty acid metal salts, fatty acid amides, amide esters, silica surface activators, fatty acid esters, mixtures of fatty acid metal salts and amide esters, and mixtures of fatty acid metal salts and fatty acid amides. These may be used alone, or two or more of these may be used in combination. Among these, fatty acid metal salts, amide esters, and mixtures of fatty acid metal salts with amide esters or fatty acid amides are preferred, with mixtures of fatty acid metal salts and fatty acid amides being particularly preferred.

The fatty acid of the fatty acid metal salt is not particularly limited. Examples include saturated or unsaturated fatty acids, preferably C6-C28, more preferably C10-C25, still more preferably 014-C20 saturated or unsaturated fatty acids, such as lauric acid, myristic acid, palmitic acid, stearic acid, oleic acid, linoleic acid, linolenic acid, arachidic acid, behenic acid, or nervonic acid. These may be used alone, or two or more of these may be used in admixture. Among these, saturated fatty acids are preferred, with C14-C20 saturated fatty acids being more preferred.

Examples of the metals of the fatty acid metal salts include alkali metals such as potassium or sodium, alkaline earth metals such as magnesium, calcium, or barium, zinc, nickel, and molybdenum. Among these, zinc or calcium is preferred, with zinc being more preferred.

The fatty acid amide may be a saturated fatty acid amide or an unsaturated fatty acid amide. Examples of the saturated fatty acid amides include N-(1-oxooctadecyl)sarcosine, stearamide, and behenamide. Examples of the unsaturated fatty acid amides include oleamide and erucamide.

Specific examples of the mixtures of fatty acid metal salts and fatty acid amides include WB16 available from Struktol which is a mixture of a fatty acid calcium salt and a fatty acid amide.

The amount of the processing aid relative to 100 parts by mass of the total rubber solids is preferably 0.3 parts by mass or more, more preferably 0.5 parts by mass or more. When the amount is less than 0.3 parts by mass, such an addition may not be sufficiently effective. The amount is also preferably 10 parts by mass or less, more preferably 7 parts by mass or less, still more preferably 5 parts by mass or less, particularly preferably 2 parts by mass or less, most preferably 1.5 parts by mass or less. When the amount is more than 10 parts by mass, slippage between the polymer phases may occur so that the polymer phases cannot be readily entangled with each other, and therefore abrasion resistance tends to deteriorate.

In addition to the above-described components, the rubber composition may incorporate appropriate compounding agents commonly used in production of rubber compositions, such as a silane coupling agent, zinc oxide, an antioxidant, wax, or a vulcanization accelerator.

The rubber composition in the present invention can be prepared by conventionally known methods, such as the method described below.

For example, first, the components other than crosslinking agents and vulcanization accelerators are compounded (added) and kneaded in a rubber kneading machine such as a Banbury mixer or an open roll mill (base kneading step) to give a kneaded mixture. Then, a crosslinking agent and a vulcanization accelerator are incorporated (added) into the kneaded mixture and kneaded (F-kneading), followed by vulcanization, whereby a rubber composition can be prepared. The rubber composition is used in treads of tires.

The base kneading step is not particularly limited as long as the rubber component and other components are kneaded. The base kneading step may be a single step, or alternatively may be divided into a series of steps such as: X-kneading in which the rubber component, ½ silica, carbon black, and ½ silane coupling agent are kneaded, and Y-kneading in which the kneaded mixture obtained by X-kneading, the remaining silica, the remaining silane coupling agent, and the other components, excluding crosslinking agents and vulcanization accelerators, are kneaded.

The pneumatic tire of the present invention can be produced from the above rubber composition by usual methods.

Specifically, the rubber composition prepared by compounding the components, before vulcanization, is extruded and processed into the shape of a tread and then assembled with other tire components on a tire building machine in a usual manner to build an unvulcanized tire. The unvulcanized tire is heated and pressurized in a vulcanizer to give a tire. In this way, a pneumatic tire including a tread that incorporates the above components is produced.

The pneumatic tire of the present invention is suitable as a tire for passenger vehicles, large passenger vehicles, large SUVs, heavy load vehicles such as trucks and buses, or light trucks, and can be used as a winter tire or a studless winter tire in these applications.

EXAMPLES

The present invention is specifically described with reference to, but not limited to, examples below.

The physical properties of the polymers prepared below are measured as described below.

[Cis Content]

The cis content was measured by infrared absorption spectrometry.

[Weight Average Molecular Weight (Mw)]

The weight average molecular weight (Mw) was measured by gel permeation chromatography (GPC) under the following conditions (1) to (8).

(1) Apparatus: HLC-8220 available from Tosoh Corporation.
(2) Separation column: HM-H available from Tosoh Corporation, two columns in series
(3) Measurement temperature: 40° C.
(4) Carrier: tetrahydrofuran
(5) Flow rate: 0.6 mL/min
(6) Injection volume: 5 μL
(7) Detector: differential refractometer
(8) Molecular weight standards: polystyrene standards

[Vinyl Content]

The vinyl content was measured by infrared absorption spectrometry.

[Bound Styrene Content]

The bound styrene content was measured with an NMR analyzer of JNM-ECA series available from Jeol Ltd.

<Preparation of Terminal Modifier>

An amount of 20.8 g of 3-(N,N-dimethylamino)-propyltrimethoxysilane (AZmax. Co) was put in a 250 mL graduated flask in a nitrogen atmosphere, and anhydrous hexane (Kanto Chemical Co., Inc.) was then added to a total amount of 250 mL, whereby a terminal modifier was prepared.

Production Example 1 (Oil-extended S-SBR)

An amount of 18 L of n-hexane, 800 g of styrene (Kanto Chemical Co., Inc.), 1,200 g of butadiene, and 1.1 mmol of tetramethylethylenediamine were charged into a 30 L pressure-proof vessel sufficiently purged with nitrogen, followed by warming to 40° C. Next, 1.8 mL of 1.6 M butyllithium (Kanto Chemical Co., Inc) was added and then the temperature was raised to 50° C., followed by stirring for 3 hours. Then, 4.1 mL of the terminal modifier was added and stirred for 30 minutes. To the reaction solution were added 15 mL of methanol and 0.1 g of 2,6-tert-butyl-p-cresol (Ouch: Shinko Chemical Industrial Co., Ltd.), and then 1,200 g of TDAE, followed by stirring for 10 minutes. The resulting polymer solution was subjected to steam stripping to collect aggregates from the polymer solution. The aggregates were dried under reduced pressure for 24 hours to obtain a modified SBR (SBR 3). The modified SBR had a bound styrene content of 41% by mass, a Mw of 1,196,000, and a vinyl content of 40 mol %.

Production Example 2 (Non-Oil-Extended S-SBR)

An amount of 18 L of n-hexane, 740 g of styrene (Kanto Chemical Co., Inc.), 1,260 g of butadiene, and 17 mmol of tetramethylethylenediamine were charged into a 30 L pressure-proof vessel sufficiently purged with nitrogen, followed by warming to 40° C. Next, 10.5 mL of butyllithium was added and then the temperature was raised to 50° C., followed by stirring for 3 hours. Then, 3.5 mL of a 0.4 mol/L solution of silicon tetrachloride in hexane was added and stirred for 30 minutes. Thereafter, 30 mL of the terminal modifier was added and stirred for 30 minutes. To the reaction solution was added 0.2 g of 2,6-tert-butyl-p-cresol (Ouchi Shinko Chemical Industrial Co., Ltd.) in 2 mL of methanol (Kanto Chemical Co., Inc.). The resulting reaction solution was put into a stainless steel vessel containing 18 L of methanol and then aggregates were collected. The aggregates were dried under reduced pressure for 24 hours to obtain a modified SBR (SBR 4). The modified SBR had a bound styrene content of 37.5% by mass, a Mw of 925,000, and a vinyl content of 55.8 mol %.

The various chemicals used in examples and comparative examples are collectively listed below.

NR: TSR20

BR 1: BR133P (Co-catalyzed BR synthesized using a Co catalyst, containing 37.5 parts by mass of paraffin oil relative to 100 parts by mass of the rubber component; vinyl content: 2 mol %, cis content: 96 mol %, Mw: 400,000) available from Ube Industries, Ltd.

BR 2: BUNA-CB24 (Nd-catalyzed BR, non-oil-extended) available from Lanxess

BR 3: BUNA-CB29 TDAE (Nd-catalyzed BR containing 37.5 parts by mass of TDAE oil relative to 100 parts by mass of the rubber component) available from Lanxess BR 4: BUNA-CB29 MES (Nd-catalyzed BR containing 37.5 parts by mass of MES oil relative to 100 parts by mass of the rubber component) available from Lanxess SBR 1: 0122 (E-SBR, oil-extended) available from JSR Corporation SBR 2: Nipol 9548 (E-SBR, oil-extended) available from Zeon Corporation SBR 3: Modified SBR for silica (oil-extended) prepared in Production Example 1

SBR 4: Modified SBR for silica (non-oil-extended) prepared in Production Example 2

Carbon black 1: SHOBLACK N330T ($N_2SA$: 71 $m^2/g$) available from Cabot Japan K. K.

Carbon black 2: SHOBLACK N220 ($N_2SA$: 114 $m^2/g$) available from Cabot Japan K. K.

Carbon black 3: SHOBLACK N134 ($N_2SA$: 148 $m^2/g$) available from Cabot Japan K. K.

Carbon black 4: HP160 ($N_2SA$: 165 $m^2/g$) available from Columbia Carbon

Carbon black 5: Trial product ($N_2SA$: 231 $m^2/g$, oil absorption number of compressed sample (COAN): 190 mL/100 g) available from Mitsubishi Chemical Corporation Silica: ULTRASIL VN3 ($N_2SA$: 175 $m^2/g$) available from Evonik Resin 1: NOVARES C10 (liquid coumarone-indene resin, softening point: 5° C. to 15° C.) available from Rutgers Chemicals Resin 2: SYLVARES SA85 (copolymer of α-methylstyrene and styrene, softening point: 85° C., Mw: 1,000) available from Arizona chemical Resin 3: Sylvares TR5147 (polyterpene resin (limonene resin), softening point: 115° C., hydroxyl value: about 0) available from Arizona Chemical Resin 4: Sylvares TP115 (softening point: 115° C., Tg: 55° C., hydroxyl value: 50, terpene phenolic resin) available from Arizona Chemical Process oil: VivaTec 400 (TDAE oil) available from H&R Wax: Ozoace 0355 available from Nippon Seiro Co., Ltd.

Antioxidant 1: Antigene 6C (N-phenyl-N'-(1,3-dimethylbutyl)-p-phenylenediamine) available from Sumitomo Chemical Co., Ltd.

Antioxidant 2: NOCRAC 224 (2,2,4-trimethyl-1,2-dihydroquinoline polymer) available from Ouchi Shinko Chemical Industrial Co., Ltd.

Stearic acid: Stearic acid "Tsubaki" available from NOF Corporation

Processing aid: WB16 (a mixture of a fatty acid metal salt (fatty acid calcium salt) and a fatty acid amide) available from Struktol Zinc oxide: Ginrei R available from Tohc Zinc Co., Ltd.

Silane coupling agent: Si75 available from Evonik

Sulfur: HK-200-5 (5% oil-containing powdered sulfur) available from Hosoi Chemical Industry Co., Ltd.

Vulcanization accelerator 1: NOCCELER NS-G (N-tert-butyl-2-benzothiazolylsulfenamide) available from Ouchi Shinko Chemical Industrial Co., Ltd.

Vulcanization accelerator 2: NOCCELER D (1,3-diphenylguanidine) available from Ouchi Shinko Chemical Industrial Co., Ltd.

Tables 1 and 2 below collectively show the physical properties of the BRs 1 to 4 and SBRs 1 to 4.

TABLE 1

| | Oil-extended/ Non-oil-extended | Extender component | Amount of oil relative to 100 parts by mass of rubber component (parts by mass) | Catalyst used in synthesis | Cis content (mol %) | Vinyl content (mol %) | Weight average molecular weight (Mw) | Remarks |
|---|---|---|---|---|---|---|---|---|
| BR 1 | Oil-extended | Paraffin oil | 37.5 | Co | 96 | 2 | 400.000 | Ube Industries, Ltd. |
| BR 2 | Non-oil-extended | — | — | Nd | 97 | 0.7 | 541.000 | Lanxess |
| BR 3 | Oil-extended | TDAE | 37.5 | Nd | 95.8 | 0.4 | 760.000 | Lanxess |
| BR 4 | Oil-extended | MES | 37.5 | Nd | 96.1 | 0.4 | 737.000 | Lanxess |

TABLE 2

| | Oil-extended/ Non-oil-extended | Extender component | Amount of oil relative to 100 parts by mass of rubber component (parts by mass) | Type of SBR | Bound styrene content (mass %) | Vinyl content (mol %) | Weight average molecular weight (Mw) | Remarks |
|---|---|---|---|---|---|---|---|---|
| SBR 1 | Oil-extended | TDAE | 34 | E-SBR | 36 | 18 | 945.000 | JSR Corporation |

TABLE 2-continued

|  | Oil-extended/Non-oil-extended | Extender component | Amount of oil relative to 100 parts by mass of rubber component (parts by mass) | Type of SBR | Bound styrene content (mass %) | Vinyl content (mol %) | Weight average molecular weight (Mw) | Remarks |
|---|---|---|---|---|---|---|---|---|
| SBR 2 | Oil-extended | TDAE | 37.5 | E-SBR | 35 | 18 | 1,085.000 | Zean Corporation |
| SBR 3 | Oil-extended | TDAE | 37.5 | Modified SBR for silica | 41 | 40 | 1,196.000 | Production Example 1 |
| SBR 4 | Non-oil-extended | — | — | Modified SBR for silica | 37.5 | 55.8 | 925.000 | Production Example 2 |

Examples and Comparative Examples

According to the formulations shown in Table 3, the total amounts of the rubber component and the carbon black and one-half of the amounts of the silica and the silane coupling agent were first kneaded using a Banbury mixer at 150° C. for 5 minutes (X-kneading). Then, the rest of the silica and the silane coupling agent, and the remaining materials (antioxidant, zinc oxide, resin, etc.) other than the crosslinking agent and the vulcanization accelerators were added and kneaded at 150° C. for 4 minutes (Y-kneading), thereby obtaining a kneaded mixture. Next, the crosslinking agent and the vulcanization accelerators were added to the kneaded mixture, and they were kneaded using an open two roll mill at 105° C. for 4 minutes (F-kneading) to prepare an unvulcanized rubber composition.

The unvulcanized rubber composition was press-vulcanized at 170° C. for 12 minutes to prepare a vulcanized rubber composition.

Separately, the unvulcanized rubber composition was extruded into the shape of a tread and assembled with other tire components on a tire building machine, followed by vulcanization at 170° C. for 12 minutes to prepare a test tire (tire size: 245/40R18, tire for passenger vehicles).

The vulcanized rubber compositions and test tires thus prepared were evaluated on the following items. Table 3 shows the results.

(Hardness)

The hardness (shore A) of the vulcanized rubber composition at 25° C. was determined using a type A durometer in accordance with JIS K 6253 "Rubber, vulcanized or thermoplastic—Determination of hardness".

To ensure safety (handling stability), the formulations of the examples and comparative examples were adjusted to a certain hardness range (60±1) at 25° C. Adjusting the hardness to a certain range permits a proper comparison of the elongation at break.

(Elongation at Break)

Tensile testing was performed at room temperature using No. 3 dumbbell specimens prepared from the vulcanized rubber composition in accordance with JIS K 6251 "Rubber, vulcanized or thermoplastic—Determination of tensile stress-strain properties" to determine the elongation at break EB (%). A larger EB value indicates better durability, and an EB value of larger than 470 means practically acceptable durability. The EB values are expressed as an index (EB index), with Comparative Example 1 set equal to 100. A higher index indicates a greater elongation at break and better durability, and an EB index of 102 or higher means practically acceptable durability.

(Wet-Grip Performance)

The test tires were mounted on a front-engine, rear-wheel-drive passenger car of 2,000 cc displacement made in Japan. A test driver drove the car 10 laps around a test track with wet asphalt road conditions and evaluated control stability during the steering of the car. The results are expressed as an index, with Comparative Example 1 set equal to 100. A higher index indicates better wet-grip performance, and an index of 100 means practically acceptable wet-grip performance.

(Abrasion Resistance)

The test tires were mounted on a front-engine, rear-wheel-drive passenger vehicle of 2,000 cc displacement made in Japan. The car was driven on a test track with dry asphalt road conditions, and then the remaining groove depth in the tire tread rubber was measured (initial depth: 8.0 mm). The remaining groove depths are expressed as an index, with Comparative Example 1 set equal to 100. A higher index indicates better abrasion resistance, and an index of 105 or higher means practically acceptable abrasion resistance; an index of 110 or higher is considered as particularly excellent abrasion resistance.

TABLE 3

| Formulation (parts by mass) | | | Ex. 1 | Com. Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|---|---|---|
| Base kneading | NR | Amount of extender oil | 0 | 0 | 0 | 0 | 0 | 0 | 0 | 0 | 0 | 0 | 0 | 0 | 0 | 0 | 0 | 0 | 0 | 0 |
| | | Amount of rubber component | 0 | 0 | 0 | 0 | 0 | 0 | 0 | 0 | 20 | 0 | 0 | 0 | 0 | 0 | 0 | 0 | 0 | 0 |
| | BR1 | Amount of extender oil | 0 | 0 | 0 | 0 | 0 | 0 | 0 | 0 | 0 | 0 | 0 | 0 | 0 | 0 | 0 | 0 | 0 | 0 |
| | | Amount of rubber component | 0 | 60 | 0 | 0 | 0 | 0 | 0 | 0 | 0 | 0 | 0 | 0 | 0 | 0 | 0 | 0 | 0 | 0 |
| | BR2 | Amount of extender oil | 22.5 | 0 | 22.5 | 24.375 | 22.5 | 22.5 | 22.5 | 22.5 | 15 | 22.5 | 22.5 | 22.5 | 15 | 15 | 22.5 | 22.5 | 22.5 | 22.5 |
| | | Amount of rubber component | 60 | 0 | 60 | 65 | 60 | 60 | 60 | 60 | 40 | 60 | 60 | 60 | 40 | 40 | 60 | 60 | 60 | 60 |
| | BR3 | Amount of extender oil | 0 | 0 | 0 | 0 | 0 | 0 | 0 | 0 | 0 | 0 | 0 | 0 | 0 | 0 | 0 | 0 | 0 | 0 |
| | | Amount of rubber component | 0 | 0 | 0 | 0 | 0 | 0 | 0 | 0 | 0 | 0 | 0 | 0 | 0 | 0 | 0 | 0 | 0 | 0 |
| | BR4 | Amount of extender oil | 0 | 0 | 0 | 0 | 0 | 0 | 0 | 0 | 0 | 0 | 0 | 0 | 0 | 0 | 0 | 0 | 0 | 0 |
| | | Amount of rubber component | 0 | 0 | 0 | 0 | 0 | 0 | 0 | 0 | 0 | 0 | 0 | 0 | 0 | 0 | 0 | 0 | 0 | 0 |
| | Total amount of BR (Rubber component) | | 60 | 60 | 60 | 65 | 60 | 60 | 60 | 60 | 40 | 60 | 60 | 60 | 40 | 40 | 60 | 60 | 60 | 60 |
| | SBR1 | Amount of extender oil | 0 | 0 | 0 | 0 | 0 | 0 | 0 | 0 | 0 | 0 | 0 | 0 | 13.6 | 0 | 0 | 0 | 0 | 0 |
| | | Amount of rubber component | 0 | 0 | 0 | 0 | 0 | 0 | 0 | 0 | 0 | 0 | 0 | 0 | 40 | 0 | 0 | 0 | 0 | 0 |
| | SBR2 | Amount of extender oil | 7.5 | 15 | 12.375 | 13.125 | 7.5 | 7.5 | 7.5 | 7.5 | 7.5 | 7.5 | 7.5 | 7.5 | 0 | 15 | 7.5 | 7.5 | 7.5 | 7.5 |
| | | Amount of rubber component | 20 | 40 | 33 | 35 | 20 | 20 | 20 | 20 | 20 | 20 | 20 | 20 | 0 | 40 | 20 | 20 | 20 | 20 |
| | SBR3 | Amount of extender oil | 0 | 0 | 0 | 0 | 0 | 0 | 0 | 0 | 0 | 0 | 0 | 0 | 0 | 0 | 0 | 0 | 0 | 0 |
| | | Amount of rubber component | 0 | 0 | 0 | 0 | 0 | 0 | 0 | 0 | 0 | 0 | 0 | 0 | 0 | 0 | 0 | 0 | 0 | 0 |
| | SBR4 | | 20 | 0 | 7 | 0 | 20 | 20 | 20 | 20 | 20 | 20 | 20 | 20 | 20 | 20 | 20 | 20 | 20 | 20 |
| | Total amount of SBR (Rubber component) | | 40 | 40 | 40 | 35 | 40 | 40 | 40 | 40 | 40 | 40 | 40 | 40 | 60 | 60 | 40 | 40 | 40 | 40 |
| | Carbon black 1 | | 0 | 0 | 0 | 0 | 0 | 20 | 0 | 0 | 0 | 0 | 0 | 0 | 0 | 0 | 0 | 0 | 0 | 0 |
| | Carbon black 2 | | 0 | 0 | 0 | 0 | 75 | 65 | 0 | 0 | 0 | 0 | 0 | 0 | 0 | 0 | 0 | 75 | 75 | 75 |
| | Carbon black 3 | | 0 | 0 | 0 | 60 | 10 | 85 | 0 | 0 | 0 | 0 | 0 | 0 | 0 | 0 | 0 | 0 | 0 | 0 |
| | Carbon black 4 | | 50 | 50 | 50 | 0 | 0 | 0 | 50 | 50 | 50 | 50 | 50 | 50 | 50 | 50 | 50 | 10 | 10 | 10 |
| | Carbon black 5 | | 0 | 0 | 0 | 0 | 0 | 0 | 0 | 0 | 0 | 0 | 0 | 0 | 0 | 0 | 0 | 0 | 0 | 0 |
| | Total amount of carbon block | | 50 | 50 | 50 | 60 | 85 | 20 | 50 | 50 | 50 | 50 | 50 | 50 | 50 | 50 | 50 | 85 | 85 | 85 |
| | Silica | | 20 | 20 | 24 | 20 | 15 | 65 | 20 | 20 | 20 | 20 | 20 | 20 | 30 | 30 | 20 | 15 | 15 | 15 |
| | Combined amount of silica and carbon black | | 70 | 70 | 74 | 80 | 100 | 85 | 70 | 70 | 70 | 80 | 70 | 70 | 80 | 80 | 70 | 100 | 100 | 100 |
| | Resin 1 | | 0 | 0 | 0 | 0 | 10 | 10 | 0 | 20 | 15 | 0 | 0 | 17 | 15 | 0 | 0 | 10 | 10 | 10 |
| | Resin 2 | | 0 | 0 | 0 | 0 | 10 | 0 | 0 | 0 | 0 | 0 | 0 | 0 | 0 | 0 | 0 | 0 | 0 | 0 |
| | Resin 3 | | 0 | 0 | 0 | 0 | 0 | 0 | 0 | 0 | 0 | 0 | 0 | 0 | 0 | 0 | 0 | 0 | 0 | 0 |
| | Resin 4 | | 0 | 0 | 0 | 0 | 0 | 0 | 0 | 0 | 0 | 0 | 0 | 0 | 0 | 0 | 0 | 10 | 0 | 10 |
| | Amount of extender oil | | 30 | 15 | 34.875 | 37.5 | 30 | 30 | 30 | 22.5 | 29.5 | 30 | 30 | 28.6 | 30 | 30 | 30 | 30 | 30 | 30 |
| | Process oil | | 5 | 20 | 0 | 0 | 9 | 0 | 5 | 7 | 5 | 5 | 5 | 0 | 0 | 5 | 5 | 9 | 0 | 0 |
| | Total amount of oil | | 35 | 35 | 34.875 | 37.5 | 39 | 30 | 35 | 29.5 | 34.5 | 35 | 35 | 28.6 | 30 | 35 | 35 | 39 | 30 | 30 |
| | Wax | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |

TABLE 3-continued

| | Ex. 18 | Ex. 19 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|---|---|---|
| Antioxidant 1 | 3 | 3 | 3 | 3 | 3 | 3 | 3 | 3 | 3 | 3 | 3 | 3 | 3 |
| Antioxidant 2 | 1 | 1 | 1 | 1 | 1 | 1 | 1 | 1 | 1 | 1 | 1 | 1 | 1 |
| Stearic acid | 2.5 | 2.5 | 2.5 | 1.5 | 1 | 2.5 | 2 | 2.5 | 2.5 | 2.5 | 2.5 | 2.5 | 2.5 |
| Processing aid | 0 | 2.9 | 0 | 0 | 0 | 0 | 1 | 0 | 0 | 0 | 2 | 0 | 0 |
| Zinc oxide | 2.5 | 2.5 | 2.5 | 2.5 | 2.5 | 2.5 | 2.5 | 2.5 | 2.5 | 2.5 | 2.5 | 2.5 | 2.5 |
| Silane coupling agent | 1.6 | 1.2 | 1.6 | 2.5 | 1.6 | 2.4 | 1.6 | 2.5 | 2.5 | 2.5 | 1.6 | 1.6 | 1.6 |
| Sulfur | 1.3 | 1.3 | 1.3 | 1.3 | 1.3 | 1.3 | 1.3 | 1.3 | 1.3 | 1.3 | 1.3 | 1.3 | 1.3 |
| Vulcanization accelerator 1 | 1.8 | 1.8 | 1.8 | 2 | 1.8 | 1.8 | 1.8 | 1.8 | 1.8 | 2.4 | 1.8 | 1.8 | 1.8 |
| Vulcanization accelerator 2 | 0.6 | 0.6 | 0.6 | 0.6 | 0.6 | 0.6 | 0.6 | 0.6 | 0.6 | 0.6 | 0.6 | 0.6 | 0.6 |
| Hardness | | | | | | adjusted to 6 ± 1 | | | | | | | |
| Elongation at break (Durability) (Target >470) | 695 | 645 | 640 | 630 | 665 | 725 | 655 | 715 | 720 | 635 | 710 | 675 | 655 |
| EB index (Target ≥102) | 111.2 | 103 | 102 | 101 | 106 | 116 | 105 | 114 | 115 | 102 | 114 | 108 | 106 |
| Wet-grip performance index (Target ≥100) | 102 | 100 | 110 | 101 | 101 | 107 | 104 | 107 | 110 | 100 | 100 | 101 | 102 |
| Abrasion resistance index (Target ≥105, Higher target ≥110) | 118 | 105 | 105 | 118 | 106 | 125 | 111 | 124 | 127 | 108 | 121 | 107 | 107 |

| Formulation (parts by mass) | | | Ex. 18 | Ex. 19 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|---|---|---|---|---|
| Base kneading | BR1 | Amount of extender oil | 0 | 0 | 0 | 0 | 0 | 0 | 0 | 0 | 0 | 0 | 0 | 0 | 0 |
| | | Amount of rubber component | 40 | 40 | 60 | 60 | 5 | 75 | 60 | 60 | 60 | 60 | 60 | 60 | 60 |
| | BR 2 | Amount of extender oil | 0 | 0 | 0 | 0 | 0 | 0 | 0 | 0 | 0 | 0 | 0 | 0 | 0 |
| | | Amount of rubber component | 0 | 0 | 0 | 0 | 55 | 0 | 0 | 0 | 0 | 0 | 0 | 0 | 0 |
| | BR 3 | Amount of extender oil | 15 | 15 | 0 | 50 | 1.875 | 28.125 | 0 | 0 | 0 | 0 | 0 | 0 | 0 |
| | | Amount of rubber component | 40 | 40 | 0 | 3.75 | 5 | 75 | 0 | 0 | 0 | 0 | 0 | 0 | 0 |
| | BR 4 | Amount of extender oil | 0 | 0 | 0 | 0 | 0 | 0 | 0 | 0 | 0 | 0 | 0 | 0 | 0 |
| | | Amount of rubber component | 0 | 0 | 0 | 10 | 0 | 0 | 0 | 0 | 0 | 0 | 0 | 0 | 0 |
| | Total amount of BR (Rubber component) | | 40 | 40 | 60 | 60 | 60 | 75 | 60 | 60 | 60 | 60 | 60 | 60 | 60 |
| | SBR 1 | Amount of extender oil | 0 | 0 | 0 | 0 | 0 | 0 | 0 | 0 | 0 | 0 | 0 | 0 | 0 |
| | | Amount of rubber component | 0 | 0 | 0 | 0 | 0 | 0 | 0 | 0 | 0 | 0 | 0 | 0 | 0 |
| | SBR 2 | Amount of extender oil | 7.5 | 0 | 7.5 | 7.5 | 7.5 | 9.375 | 7.5 | 7.5 | 7.5 | 7.5 | 7.5 | 7.5 | 7.5 |
| | | Amount of rubber component | 20 | 20 | 20 | 20 | 20 | 25 | 20 | 20 | 20 | 20 | 20 | 20 | 20 |
| | SBR 3 | Amount of extender oil | 0 | 0 | 0 | 0 | 0 | 0 | 0 | 0 | 0 | 0 | 0 | 0 | 0 |
| | | Amount of rubber component | 20 | 20 | 20 | 20 | 20 | 25 | 20 | 20 | 20 | 50 | 20 | 20 | 20 |
| | SBR 4 | Total amount of SBR (Rubber component) | 40 | 40 | 40 | 40 | 40 | 25 | 40 | 40 | 40 | 40 | 40 | 40 | 40 |
| | Carbon black 1 | | 0 | 0 | 0 | 0 | 0 | 0 | 0 | 0 | 0 | 0 | 0 | 0 | 0 |
| | Carbon black 2 | | 0 | 0 | 0 | 0 | 0 | 0 | 0 | 105 | 0 | 0 | 0 | 0 | 0 |
| | Carbon block 3 | | 0 | 0 | 0 | 0 | 0 | 0 | 0 | 0 | 0 | 0 | 0 | 0 | 0 |

TABLE 3-continued

| | | | | | | | | | | | | | |
|---|---|---|---|---|---|---|---|---|---|---|---|---|---|
| Carbon black 4 | 50 | 50 | 50 | 50 | 50 | 50 | 10 | 0 | 0 | 15 | 50 | 50 | 50 |
| Carbon black 5 | 0 | 0 | 0 | 0 | 0 | 0 | 0 | 0 | 45 | 0 | 0 | 0 | 0 |
| Total amount of carbon block | 50 | 50 | 50 | 50 | 50 | 50 | 10 | 105 | 45 | 65 | 50 | 50 | 50 |
| Silica | 30 | 30 | 20 | 20 | 20 | 30 | 75 | 15 | 20 | 20 | 20 | 20 | 20 |
| Combined amount of silica and carbon black | 80 | 80 | 70 | 70 | 70 | 80 | 85 | 120 | 65 | 85 | 70 | 70 | 70 |
| Resin 1 | 15 | 15 | 0 | 0 | 0 | 0 | 0 | 20 | 0 | 0 | 0 | 0 | 0 |
| Resin 2 | 0 | 0 | 0 | 0 | 0 | 0 | 0 | 10 | 0 | 0 | 0 | 0 | 0 |
| Resin 3 | 5 | 0 | 0 | 0 | 0 | 0 | 0 | 0 | 0 | 0 | 0 | 0 | 0 |
| Resin 4 | 0 | 5 | 0 | 0 | 0 | 0 | 0 | 0 | 0 | 0 | 0 | 0 | 0 |
| Amount of extender oil | 30 | 30 | 30 | 11.25 | 9.375 | 37.5 | 30 | 30 | 30 | 30 | 30 | 30 | 30 |
| Process oil | 0 | 0 | 5 | 23.75 | 25.63 | 10 | 5 | 10 | 5 | 5 | 5 | 5 | 5 |
| Total amount of oil | 30 | 30 | 35 | 35 | 35.005 | 47.5 | 35 | 40 | 35 | 35 | 35 | 35 | 35 |
| Wax | 1.5 | 1.5 | 1.5 | 1.5 | 1.5 | 1.5 | 1.5 | 1.5 | 1.5 | 1.5 | 1.5 | 1.5 | 1.5 |
| Antioxidant 1 | 3 | 3 | 3 | 3 | 3 | 3 | 3 | 3 | 3 | 3 | 3 | 3 | 3 |
| Antioxidant 2 | 1 | 1 | 1 | 1 | 1 | 1 | 1 | 1 | 1 | 1 | 1 | 1 | 1 |
| Stearic acid | 2.5 | 2.5 | 2.5 | 2.5 | 2.5 | 2.5 | 2.5 | 2.5 | 2.5 | 2.5 | 0.75 | 2.5 | 2.5 |
| Processing aid | 0 | 0 | 0 | 0 | 0 | 0 | 0 | 0 | 0 | 0 | 0 | 4.0 | 5.0 |
| Zinc oxide (Final kneadling) | 2.5 | 2.5 | 2.5 | 2.5 | 2.5 | 2.5 | 2.5 | 2.5 | 2.5 | 2.5 | 2.5 | 2.5 | 2.5 |
| Silane coupling agent | 2.4 | 2.4 | 1.6 | 1.6 | 1.6 | 2.4 | 6 | 1.2 | 1.6 | 1.6 | 1.6 | 1.6 | 1.6 |
| Sulfur | 1.3 | 1.3 | 1.3 | 1.3 | 1.3 | 1.3 | 1.3 | 1.3 | 1.3 | 1.3 | 1.3 | 1.3 | 1.3 |
| Vulcanization accelerator 1 | 1.8 | 1.8 | 1.8 | 1.8 | 1.8 | 1.8 | 1.8 | 12 | 1.8 | 1.8 | 3 | 1.8 | 1.8 |
| Vulcanization accelerator 2 | 0.6 | 0.6 | 0.6 | 0.6 | 0.6 | 0.6 | 0.6 | 1.5 | 0.6 | 0.6 | 0.6 | 0.6 | 0.6 |
| Evaluation – Hardness | adjusted to 6 ± 1 | | | | | | | | | | | | |
| Elongation at break (Durability) (Target >470) | 735 | 730 | 605 | 650 | 625 | 615 | 625 | 595 | 620 | 645 | 620 | 660 | 615 |
| EB index (Target ≥102) | 118 | 117 | 96.8 | 104 | 100 | 98.4 | 100 | 95.2 | 99.2 | 103 | 99.2 | 106 | 98.4 |
| Wet-grip performance index (Target ≥100) | 110 | 112 | 100 | 100 | 100 | 100 | 117 | 100 | 101 | 98 | 99 | 98 | 97 |
| Abrasion resistance index (Target ≥105, Higher target ≥110) | 130 | 129 | 91 | 104 | 102 | 104 | 97 | 85 | 104 | 88 | 104 | 104 | 103 |

The results shown in Table 3 demonstrate that abrasion resistance was greatly improved while maintaining good wet-grip performance and good durability in the examples using rubber compositions each of which contained predetermined amounts of a specific oil-extended polybutadiene rubber, of an isoprene-based diene rubber and/or a styrene-butadiene rubber, of a specific carbon black, and of stearic acid, and had an amount of process oil reduced to a predetermined value or less.

In particular, the results show that an abrasion resistance index of 110 or higher, i.e. particularly excellent abrasion resistance, was achieved in the examples in which the amount of the polybutadiene rubber component contained in the specific oil-extended polybutadiene rubber according to the present invention was 35% to 65% by mass based on 100% by mass of the total rubber solids; the amount of the specific carbon black according to the present invention was 50 parts by mass relative to 100 parts by mass of the total rubber solids; the amount of the stearic acid was 1.5 to 2.5 parts by mass relative to 100 parts by mass of the total rubber solids; the amount of process oil was reduced to 5 parts by mass or less relative to 100 parts by mass of the total rubber solids; and the amount of processing aid was reduced to 1.5 parts by mass or less relative to 100 parts by mass of the total rubber solids.

The invention claimed is:

1. A pneumatic tire, comprising a tread formed from a rubber composition, the rubber composition comprising:

an oil-extended polybutadiene rubber having a cis content of 95 mol % or more, a vinyl content of 1 mol % or less, and a weight average molecular weight of 530,000 or more;

at least one of an isoprene-based diene rubber or a styrene-butadiene rubber;

a carbon black having a nitrogen adsorption specific surface area of 110 to 200 $m^2/g$; and stearic acid, the oil-extended polybutadiene rubber being synthesized using a rare earth catalyst, the rubber composition comprising, based on 100% by mass of the total rubber solids, 8% to 65% by mass of a polybutadiene rubber component contained in the oil-extended polybutadiene rubber and 20% to 85% by mass of the at least one of an isoprene-based diene rubber or a styrene-butadiene rubber, the rubber composition comprising, relative to 100 parts by mass of the total rubber solids, 20 to 100 parts by mass of the carbon black and 1.5 to 2.99 parts by mass of the stearic acid, the rubber composition having an amount of process oil of 9 parts by mass or less relative to 100 parts by mass of the total rubber solids.

2. The pneumatic tire according to claim 1, wherein the oil-extended polybutadiene rubber has a weight average molecular weight of 700,000 or more.

3. The pneumatic tire according to claim 1, wherein the rubber composition comprises the carbon black in an amount of 40 to 80 parts by mass relative to 100 parts by mass of the total rubber solids.

4. The pneumatic tire according to claim 2, wherein the rubber composition comprises the carbon black in an amount of 40 to 80 parts by mass relative to 100 parts by mass of the total rubber solids.

* * * * *